March 8, 1932.  C. LENDVAY  1,848,894

DISTANCE OR MAP MEASURING INSTRUMENT

Filed June 11, 1927

INVENTOR
CHARLES LENDVAY
By
Attorney

Patented Mar. 8, 1932

1,848,894

UNITED STATES PATENT OFFICE

CHARLES LENDVAY, OF BUDAPEST, HUNGARY

DISTANCE OR MAP MEASURING INSTRUMENT

Application filed June 11, 1927, Serial No. 198,195, and in Germany October 2, 1926.

This invention comprises an instrument for measuring the length of the lines given on a map and for determining the directions; for determining slopes or gradients; for measuring the "lateral angle" of targets by means of graduations and for marking the distance of the target in a given direction; for obtaining data when making sketches, for the exact determination of the position of the target and of the position further for fixing the length of column of various kinds of troops. The instrument can be used in any weather, and it not only replaces, for the determination of the positions of targets which are situated at short distances, the relatively very expensive prismatic binoculars provided with graticules, but also reduces the drawbacks due to the small field of vision of the binoculars.

The advantage of the novel construction according to the invention, over the other known distance measuring devices (map measuring devices) which are at present used, is that it is possible to read directly not only the measure units of military maps, but also those of land survey maps; the instrument is also suitable not only for distance measuring, but also for measuring angles. It is therefore possible to solve problems which are of importance for land surveying and could not be hitherto solved with other map measuring devices. As further advantages must be mentioned also the simple construction and the ease of manipulation, as well as the fact that the instrument is made of a tough hard metal such as stainless steel which does not easily oxidize, that it is sensitive, is of small dimensions and light weight and is cheap.

Figure 1:
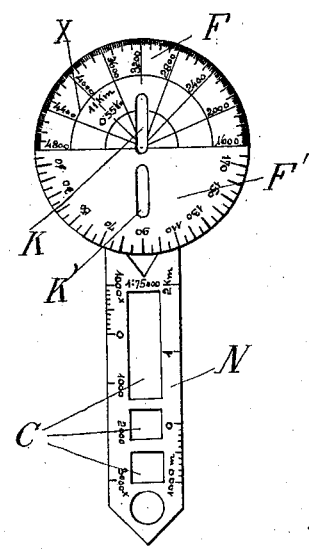
Figure 2:
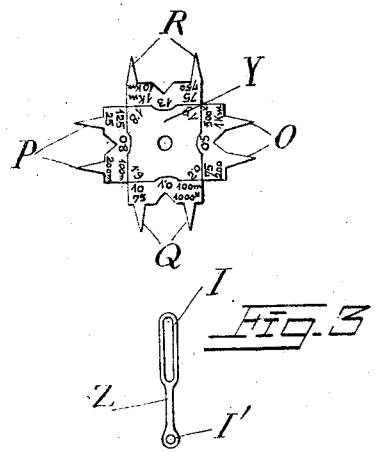
Figure 3:
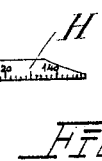
Figure 4:
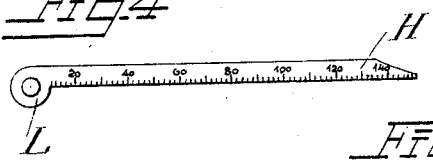

In the accompanying drawings, Figure 1 shows in plan the bed plate, Figure 2 is a plan of the front plate and measuring points, and Figure 3 shows the coupling. In Figure 4 is shown the radius bar, in Figure 5 the whole instrument completely erected, in plan, and in Figure 6 in side elevation. Figures 7 and 8 show in plan and in side elevation the connection of the universal measuring instrument to a compass arranged under it.

In a construction according to the invention, given by way of example, the bed plate is constituted by a circular single-piece head consisting of the sections F, F' with a handle or grip N made in one piece with it. On the upper half F of the head piece and on its lower half F' are provided elongated recesses K and K' in which are arranged the spindles or pins T, T' which, as shown in the lateral elevation according to Figure 6, are arranged so that they can be moved up and down.

Figures 5, 6:
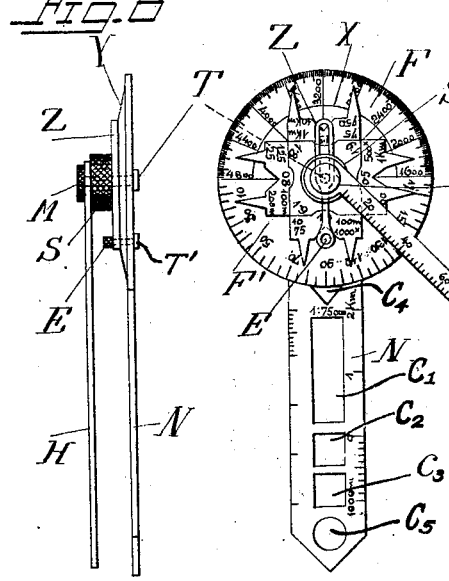
Figures 7, 8:
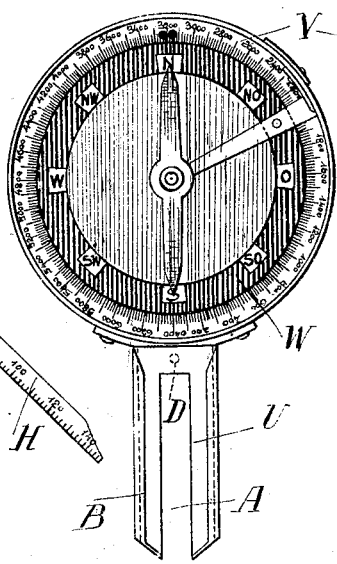

In the basic position according to Figure 6, the pin T engages with the lower portion of the recess K, which also forms the centre of the circle of the bed plate. At the same time, the pin T' is situated in the lower portion of the recess K'.

The circular head piece comprising the upper half F and the lower half F' is divided into 6,400 parts by means of graduations but only the divisions between 1600 and 4800 are made on the face of plate F around the periphery thereof. Nine equiangular radial lines extend to the center of the arc of the upper half F of the head piece and the arc between the respective intersections of these radial lines with the circumference represents $\frac{1}{16}$th of the circumference of the head piece. Since the head piece has 6,400 parts and since each sector is $\frac{1}{16}$th of the total circumference, each sector will represent 400 parts. The portion of the arc between said radial lines is divided into fourths by relatively short radial lines and the divisions so formed represent 100 parts or 1/64th of the total circumference. Each of these fourths is further subdivided in to fifths marked off by still shorter radial lines and representing 20 parts or 1/320th of the total circumference.

The numbers near the arcs marked X, indicate the distances from the centre of the circle in kilometers, for maps on the scale of 1 : 75,000.

The arc of the lower half F' of the head piece is provided with graduations in degrees, every 20 degrees being shown with a radial line with the numbering 10–170, every 10 degrees with similar intermediate radial lines, but without numbering, and every 5 degrees with a shorter line.

Rectangular recesses $C_1$, $C_2$, and $C_3$ are cut or stamped out of the handle N, these recesses are symmetrically disposed with respect to the longitudinal center line of handle N and have lengths which decrease progressively with the displacement from the lower half of the head piece F'. The recesses are used as guides for drawing rectangles representing different types of military units. The longest rectangular recess $C_1$ is nearest the lower half of the head piece F' and a rectangle drawn with it as a guide represents the length of a column of a regiment. The central rectangular recess $C_2$ is of a size which represents the length of a column of an independent battalion while the third and smallest rectangular recess $C_3$ is used when the length of the column of a marching battery is to be represented.

A triangular recess $C_4$ is provided adjacent the lower half of the head piece F', symmetrically disposed with respect to the longitudinal center line of handle N and is used when a representation of forms such as railway protecting detachments, connecting and supply depots, artillery observers, etc., is desired. The circular recess $C_5$ disposed near the tip of handle N is used for drawing circles representing commanding points such as company, battalion and regimental head quarters.

Recesses $C_1$, $C_2$, $C_3$, $C_4$, and $C_5$ are of such a size that the figures drawn by use thereof will be to a scale of 1:75,000. The edges of the handle N are graduated to form a scale of the same proportion, 1:75,000, reading directly in paces, steps or meters, as desired.

In the drawings, Figure 2 shows a plan of the front plate Y and measuring points. From this front plate extend in four directions pairs of wedge shaped points O, P, Q, R. The distance or interval between the points in each of said pairs, expressed in centimeters, is given by the numbers such as 0.5, 0.8, 1.0, 1.3 which are marked next to the data of the pairs of points. Numerals such as 10, 12.5, 25, 75, 200 and 750 are marked on the front plate Y adjacent the base of the left point of the pairs of points O, P, Q and R. The number near the base of the point of the pair in use must be multiplied by 1,000 to indicate the scale to which that particular setting is adapted. The results of these multiplications will be 10,000, 12,500, 25,000, 75,000, 200,000 and 750,000 respectively, indicating that the instrument is set for work on a map having a corresponding scale. The distances expressed in centimeters in accordance with the scale given, are expressed by the numbers such as 100 m., 200 m., 500 m., 1000 m., 10 km., arranged at the right hand side of the pairs of points.

The distance between the wedge shaped points which belong to different pairs of points, but which adjoin each other, is given by those numbers which can be seen in the corners of the innermost portion of the front plate Y, such as 1.8, 1.9, 2.0. The front plate is to be placed with the small circular recess provided in its centre on the pin T as shown in Figure 6.

In the drawings, Figure 3 shows the coupling plate Z. The pin T' of Figure 6 is passed through the recess K' of Figure 1 from the back towards the front, in such a manner that its collar is in contact with the back of the lower head piece of the bed plate. The coupling plate Z is thereupon placed with its circular recess I' over the pin T' and secured by means of the screw E. In this way, the coupling plate Z is coupled to the bed plate F', so that the pin T', on being moved up and down in the recess K' will always move with it the coupling plate by means of the circular recess I'. The plate Z is moreover provided with an elongated slot I.

The pin T according to Figure 6 is pushed through the recess K of Figure 1 in such a manner that its collar is in contact with the back of the upper head piece F of the bed plate. The front plate Y is thereupon placed with the small circular perforation provided in its centre, on the pin T. The elongated recess I of the coupling plate Z comes over the pin T, owing to which the bed plate, the front plate and the coupling plate are connected together.

In order to bring the front plate which is mounted centrally on the pin T, into the position ready for measuring distances, it is moved upwards in the recess K with the coupling plate, until the front plate has completely covered the number 3200 of the graduations, which is situated at the upper portion F of the bed plate. At the same time the two pins T and T' which project from the recesses K, K' of the bed plate F and F', are pushed upwards; the pins T and T' have been therefore advanced to the upper limit of the recesses K and K'; at the same time, however, the pin T' has engaged with a triangular recess of the front plate, between a pair of points, and owing to this, the pin T' has fixed the front plate in a given plane. In order to prevent a protruding pair of points (for instance R) of the front plate from slipping back during the working, the screw S according to Figure 6 is tightened on the pin T, owing to which the coupling plate is pressed against the front plate, and the latter against the bed plate.

If for measuring the distances on a map drawn to another scale, another pair of points (for instance O) are required, the screw S must be loosened, and the coupling plate Z alone, without the front plate Y, moved back to the original position. The pin T' is thus withdrawn from a triangular recess, and the front plate again becomes rotatable about the pin T which passes through the centre of the front plate. The front plate is now turned until the selected pair of points are uppermost is continued until another portion of the front plate shows the desired scale, and no longer covers the graduation number 3200 on the upper edge of the bed plate. The coupling plate is thereupon again moved upward until the pin T' has engaged the triangular recess between the desired pair of points on the front plate. The screw S is then tightened again.

If the front plate is to be used for measuring distances on the land survey maps and other maps, for which distances the pairs of points do not contain the desired data, the proceeding is as follows: After loosening the screw S, the front plate is turned about the pin T' in the manner already described so that the two adjacent points belonging to two adjoining pairs of points enclose the graduation number 3200 of the bed plate. The coupling plate is thereupon pushed upward until the rectangular recess which is situated between two points opposite the points mentioned (for instance the adjacent points of the pairs of points P and Q) no longer engage with the pin T'. In order to prevent the front plate from slipping back during the measuring, the screw E is tightened.

Figure 4 of the drawings shows another part of the invention, the radius bar or plate H. Starting from the centre of the joint L of the radius plate, on the said plate are arranged graduations in which each 20th one is provided with a long line. The numbers are from 20-140, and each 10th stroke with a line of the same length as the one mentioned, but without any numbering, and intermediate graduations are indicated by a shorter line.

The radius plate or bar H of Figure 6 is mounted on the rim T in such a manner that it is rotatably secured on the screw S over the joint L by means of another screw M. The radius plate can therefore be turned at will about the graduations of the bed plate. The edge of the bar H provided with the graduations, can be directed, after the screw M has been tightened, to any desired graduation, and therefore would fix the lateral angle of the target. As the graduations of the radius plate represent millimeters, distances could also be determined along the radius plate and plotted directly.

Figure 5 shows by way of example a construction of the instrument according to the invention in plan, with all its parts. On the bed plate can be seen the front plate and the coupling plate in basic position. The radius plate shows a deviation from its original position to the right of the handle of the bed plate. The edge of the radius plate, which is provided with the graduations, would be at 45° in this case, reckoning from the graduation 90 of the bottom head piece F of the bed plate.

In order to have a constant for the measuring operations just described, according to the invention the distance of the measuring device from the eye of the observer is fixed by securing the universal instrument to a cord or chain (not shown) which engages by means of one end with the lowest opening of the stem N, and at the other end is secured to a cord to be placed round the neck of the observer. In practical construction it was found that a distance of 50 cm. is suitable for the purpose, the length of cord being accordingly made such that on the loop being placed round the neck of the observer, and on the cord being tightened, the instrument is situated at a distance of exactly 50 cm. from the eye.

According to Figures 7 and 8, the universal measuring instrument, is connected to a compass arranged under it. The compass itself is marked V, the inner surface of the compass provided with a phosphorescent or luminous composition is marked W, the indications of the cardinal points being recessed, so that they are surrounded in a clear manner by the luminous composition and can be easily recognized in the dark.

In order to secure the measuring instrument to the compass V, on the latter, parallel to the handle N of the instrument, is provided a bar shaped holder device U with a central slot A. The sides of the device U are flanged over to form grooves B for the purpose of introducing and holding fast the bar N, the said grooves preventing the instrument from being lifted off from the compass arranged under it.

The slot A is chiefly provided for the purpose of enabling the swivel hook with the cord which is to be worn round the neck of the observer, to be freely moved in it, and of avoiding that it should strike or jam against the bar U.

When using the instrument with the compass, both parts are secured to the cord giving the constant distance, the measuring instrument engaging with the bar, but in a detachable manner.

Moreover, on the back face of the bar U is provided a hole D in order to enable the swivel hook secured to the bar, to be fixed therein.

Having now particularly described and ascertained the nature of my said invention and in what manner the same is to be performed, I declare that what I claim is:—

1. In a measuring instrument for the determination of distances, directions and angles on a map and in the field, in combination, a compass, a bed plate consisting of a circular head piece and a handle, holder means attached to said compass and engaging said handle to position said circular head piece over said compass, said head piece being provided with graduations around the peripheral surface thereof, a front plate rotatably mounted above said head piece and having distance measuring points, a radius plate rotatably mounted above said front plate and a pin passing through said bed plate, said front plate and said radius plate providing a common pivoting point, the handle of said bed plate being provided with graduations for the measuring and plotting of distances.

2. In a measuring instrument for the determination of distances, directions and angles on a map and in the field, in combination, a compass, a bed plate consisting of a circular head piece and a handle, a channel shaped holder attached to said compass for slidably engaging said handle and positioning said head piece over said compass, the head piece being provided with graduations around the peripheral surface thereof, a front plate provided with distance measuring points, a radius plate pivotally mounted above said head piece for measuring angles, detachable means for rotatably securing the front plate to the bed plate so that the front plate may be rotated relative to the bed plate and secured in any desired position, and the handle of the bed plate being provided with graduations for the measuring and plotting of distances.

3. In a measuring instrument for the determination of distances, directions and angles on a map and in the field, in combination, a compass, a bed plate consisting of a circular head piece and a handle, a channel shaped holder attached to said compass for slidably engaging said handle and positioning said head piece over said compass, the head piece being provided with graduations around the peripheral surface thereof and a radial slot and the handle of the bed plate being provided with graduations for the measuring and plotting of distances, a front plate provided with distance measuring points, a radius plate pivotally mounted above said head piece for measuring angles, and a pin adjustably secured in said radial slot and on which the front plate is mounted so that the measuring points thereof may project beyond the edge of the bed plate.

4. In a measuring instrument for the determination of distances, directions and angles on a map and in the field, in combination, a compass, a bed plate consisting of a circular head piece and a handle, a channel shaped holder provided with a recess, attached to said compass for slidably engaging said handle and positioning said head piece over said compass, the head piece being provided with graduations around the peripheral surface thereof and a radial slot, a front plate provided with distance measuring points and recesses between the points, a radius plate pivotally mounted above said head piece for measuring angles, a pin adjustably secured in said radial slot and on which the front plate is mounted, a coupling plate engaging the front plate pin, a pin on which the coupling plate is mounted, and a second radial slot provided in the bed plate for guiding the coupling plate pin so that the latter may engage a notch in the front plate to prevent rotation of the front plate when desired.

5. In a measuring instrument as recited in claim 4 wherein the radius plate is pivotally connected to the front plate at the center thereof and is provided with graduations in millimeters to enable angles and lengths to be measured.

6. In a measuring instrument for the determination of distances, directions and angles on a map and in the field, in combination, a compass, a bed plate consisting of a circular head piece and a handle, holder means attached to said compass for slidably engaging said handle to position said head piece over said compass, the head piece being provided with graduations around the peripheral surface thereof and a radial slot, and the handle being provided with graduations for the measuring and plotting of distances and with recesses for indicating lengths, a front plate provided with distance measuring points and recesses between the points, a pin adjustably secured in said radial slot and on which the front plate is mounted, a radius plate pivotally secured to said pin and provided with graduations in millimeters to enable angles and lengths to be measured, a coupling plate engaging the pin, a second pin on which the coupling plate is mounted there being a second radial slot provided in the bed plate for guiding the coupling plate pin so that the latter may engage a recess in the front plate to prevent rotation of the front plate when desired.

CHARLES LENDVAY.